Patented Jan. 30, 1934

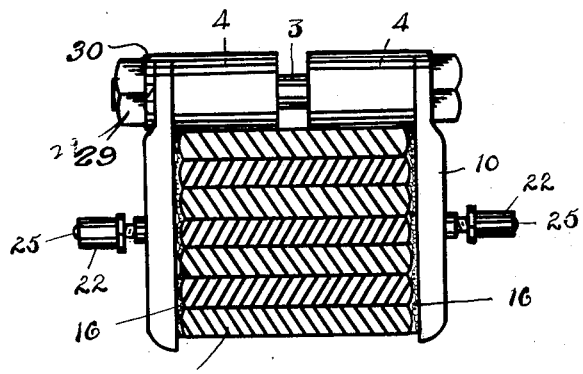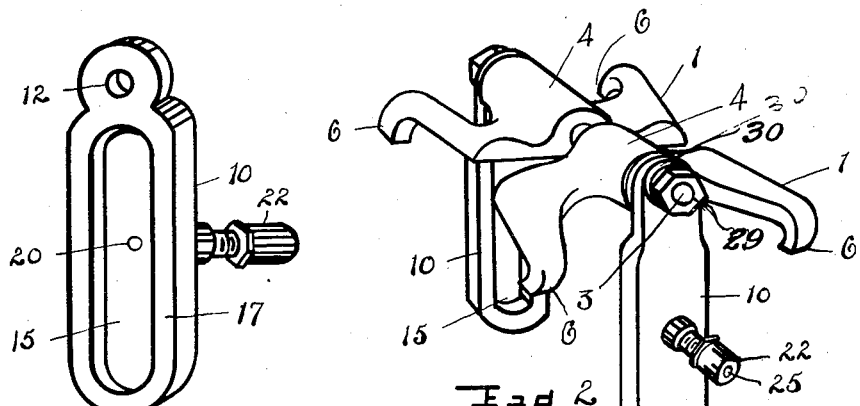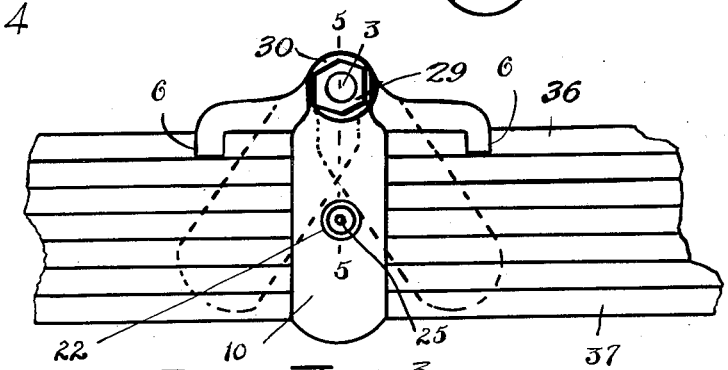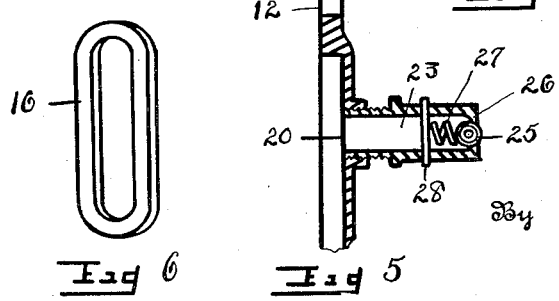

1,945,187

UNITED STATES PATENT OFFICE 1,945,187

LEAF SPRING LUBRICATOR

Stephen H. Gallagher, Utica, N. Y.

Application May 19, 1931. Serial No. 538,517

5 Claims. (Cl. 184—1)

My invention relates to a leaf spring lubricator and I declare the following to be a full, clear, concise and exact description thereof, sufficient to enable anyone skilled in the art to which it appertains to make and use the same, reference being had to the accompanying drawing in which like reference characters refer to like parts throughout the specification.

The object of the invention is to provide a device that can be quickly and easily attached to the leaf spring of an automobile or other conveyance to provide lubrication to said spring. The invention contemplates two pivotally mounted members that are held to the leaf spring in a detachable manner. These members are formed with chambers to accommodate grease that is forced into said chambers and between the members of the leaf spring.

The object will be understood by referring to the drawing in which,

Figure 1 is an elevational view showing the device applied to a leaf spring which is in section.

Figure 2 is the perspective view of the device.

Figure 3 is a side elevation showing the same attached to a leaf spring in fragment.

Figure 4 is a detailed view somewhat enlarged showing a perspective of the grease cup employed.

Figure 5 is a detailed view somewhat enlarged showing a section taken on a line 5—5 of Figure 3, parts being broken away.

Figure 6 is a detailed view showing a perspective of a felt washer employed.

Referring more particularly to the drawing, the device consists of two clamping members 1, 1 which are made alike and are adapted to cooperate with each other. Said members 1, 1 are held in given relation upon a leaf spring 2 by a headed bolt 3 that engages suitable recesses formed in elevated parts 4, 4 of members 1, 1. Members 1, 1 are equipped with depending flanges 6, 6 in each instance which engage the lateral side of leaf spring 2, whereby to hold the device in place upon said leaf spring.

It will be observed that flanges 6, 6 have a curved inner surface to conform to the curved edge of the adjacent leaf of the laminated leaf spring 2, whereby to effect a tight clamping fit.

Bolt 3 not only holds members 1, 1 in position but projects therebeyond, whereby to form a fulcrum or pivot for the grease holding members 10, 10.

Each of the grease holding members 10, 10 has an upper reduced part with an aperture at 12 for the reception of bolt 3. The lower part of each of the members 10 has an open chamber 15 into which is forced grease. A felt pad or washer 16 is adapted to seal the space between the surface 17 of member 10 and the contiguous surface of spring 2, whereby to prevent the grease from escaping therepast. The means for filling chamber 15 embodies a grease opening 20. This opening 20 is internally screw threaded for mounting the cap member 22. Cap member 22 has an interior conduit 23 that aligns with the conduit of opening 20. The conduit 23, however, is normally closed by a ball valve 25 held yieldingly in closed position against its seat 26 in the end of member 22 by a spring 27 that presses at one end against ball 25 and at the other against pin 28. Pin 28 is projected through suitable aligned apertures made in member 22. In order to force grease through the grease cup 22 into the chamber 15 of member 10, a usual well known force pump is applied to the outer end of member 22 and manipulated in the usual manner to force the grease against ball 25 which yields and allows said grease to enter chamber 15.

Members 10, 10 may be swung within the arc indicated by the dotted lines in Figure 3, whereby to allow for adjustment according to different thicknesses of springs 2.

The operation of the device is effected by assembling members 1, 1 to the top 36 or bottom leaf 37 of the leaf spring 2. They are clamped thereon by means of a headed bolt 3, nut 29 and lock washer 30. Members 10, 10 will be swung in the arc of the circle to correspond to the thickness of leaf spring 2, whereby the lower end of member 10 will not project beyond the lower or bottom leaf 37 of spring 2. Grease is forced into members 10, 10 through members 22, 22 by the usual grease gun, not shown. The grease forced into chamber 15 of each of the members 10 will supply sufficient grease to lubricate the interstices of the laminated spring 2.

Having thus described my invention what I claim as new and desire to secure by Letters Patent is as follows:

1. In a leaf spring lubricator, members adapted to be clamped to a leaf spring, other members held adjacent to said spring and having chambers for holding grease, said chambers having open parts located adjacent to said spring, said second named members being pivotally mounted on said first named members and inlet valve members mounted in said second named members, whereby to allow for supplying grease to said chambers.

2. In a leaf spring lubricator, members adapted to be mounted to a spring, means for clamping said members to one of the leaves of said spring, and other members pivotally mounted on said first named members and having chambers for holding grease, and said chambers having openings adjacent said spring, whereby the grease in said chambers will come in contact with said spring.

3. In a leaf spring lubricator, members adapted to be clamped to a spring, another member having a lubricant chamber with one side open for the exit of the lubricant, said second named member being pivotally supported on said first named members, and a pad mounted on said second named member to aid in directing the escape of the lubricant from said chamber.

4. In a leaf spring lubricator, clamping members mounted to a spring, other members pivotally supported on said clamping members and having chambers for the storage of grease, said chambers having open faces formed therein, means disposed on said pivotally mounted members to aid in directing the escape of grease from said chambers and valve inlet means mounted on said second named members, whereby to admit the supply of grease thereto.

5. In a leaf spring lubricator, means for clamping the same to a spring, adjustable members having chambers for holding grease, said adjustable members being pivotally mounted on said first named means, and said chambers communicating with said spring whereby the grease in said chambers will lubricate said spring.

STEPHEN H. GALLAGHER.